United States Patent [19]

Malmström

[11] Patent Number: 5,013,512
[45] Date of Patent: May 7, 1991

[54] METHOD OF MANUFACTURING AN ELONGATED STRUCTURAL MEMBER

[76] Inventor: Sven E. Malmström, Erlenstrasse 42 CH 3612, Steffisburg, Switzerland

[21] Appl. No.: 372,150

[22] Filed: Jun. 26, 1989

Related U.S. Application Data

[63] Continuation of Ser. No. 183,422, Apr. 18, 1988, abandoned, which is a continuation of Ser. No. 39,839, Apr. 17, 1987, abandoned, which is a continuation of Ser. No. 830,823, Feb. 19, 1986, Pat. No. 4,677,201.

[30] Foreign Application Priority Data

Feb. 19, 1985 [SE]  Sweden ................. 8500767
Feb. 19, 1985 [SE]  Sweden ................. 8500769

[51] Int. Cl.⁵ ............................................. B29C 43/18
[52] U.S. Cl. ............................... 264/255; 264/258; 156/172
[58] Field of Search ............ 264/45.1, 46.6, 545, 264/248, 255, 257, 258, 136, 137; 156/172, 173; 273/73 F

[56] References Cited

U.S. PATENT DOCUMENTS

| 2,694,661 | 11/1954 | Meyer | 156/180 X |
|---|---|---|---|
| 3,840,626 | 10/1974 | Laskawy et al. | 273/73 F X |
| 3,896,858 | 7/1975 | Whatley | 273/73 F X |
| 3,949,988 | 4/1976 | Staufer | 264/46.6 X |
| 4,061,520 | 12/1977 | Cecka et al. | 264/45.1 X |
| 4,128,968 | 12/1978 | Dano | 264/46.6 |
| 4,154,634 | 5/1979 | Shobert et al. | 264/258 X |
| 4,177,990 | 12/1979 | Kajiwara | 273/73 F X |
| 4,194,738 | 3/1980 | Inoue et al. | 264/46.6 X |
| 4,361,533 | 11/1982 | Jenks | 264/258 |
| 4,390,182 | 6/1983 | You | 273/73 F X |
| 4,413,822 | 11/1983 | Fernandez et al. | 264/46.6 X |
| 4,460,423 | 7/1984 | Bosnia | 264/46.6 X |
| 4,506,887 | 3/1985 | Trysinsky | 156/172 X |
| 4,544,518 | 10/1985 | Lindskog | 264/257 |

FOREIGN PATENT DOCUMENTS

| 0158118 | 3/1985 | European Pat. Off. |
| 1185510 | 3/1970 | United Kingdom . |
| 1244735 | 9/1971 | United Kingdom . |
| 2077880 | 12/1981 | United Kingdom . |
| 2143768 | 2/1985 | United Kingdom . |

Primary Examiner—Jay H. Woo
Assistant Examiner—Jeremiah F. Durkin, II
Attorney, Agent, or Firm—Pollock, Vande Sande & Priddy

[57] ABSTRACT

A method of manufacturing an elongated, multi-component structural member. A porous core is formed and a first layer of an air-tight skin is applied to the core. A second layer of peripherally extending fibers is applied to the first layer. A third layer of axially extending fibers impregnated with excess resin is applied to the second layer. A fourth layer of peripherally extending fibers which are resin-free is applied to the third layer and the resulting member is placed in a mold and cured. The excess resin from the third layer of fibers impregnates the fourth layer of fibers. An assembly of more than one core with fibers may be placed in the mold.

5 Claims, 2 Drawing Sheets

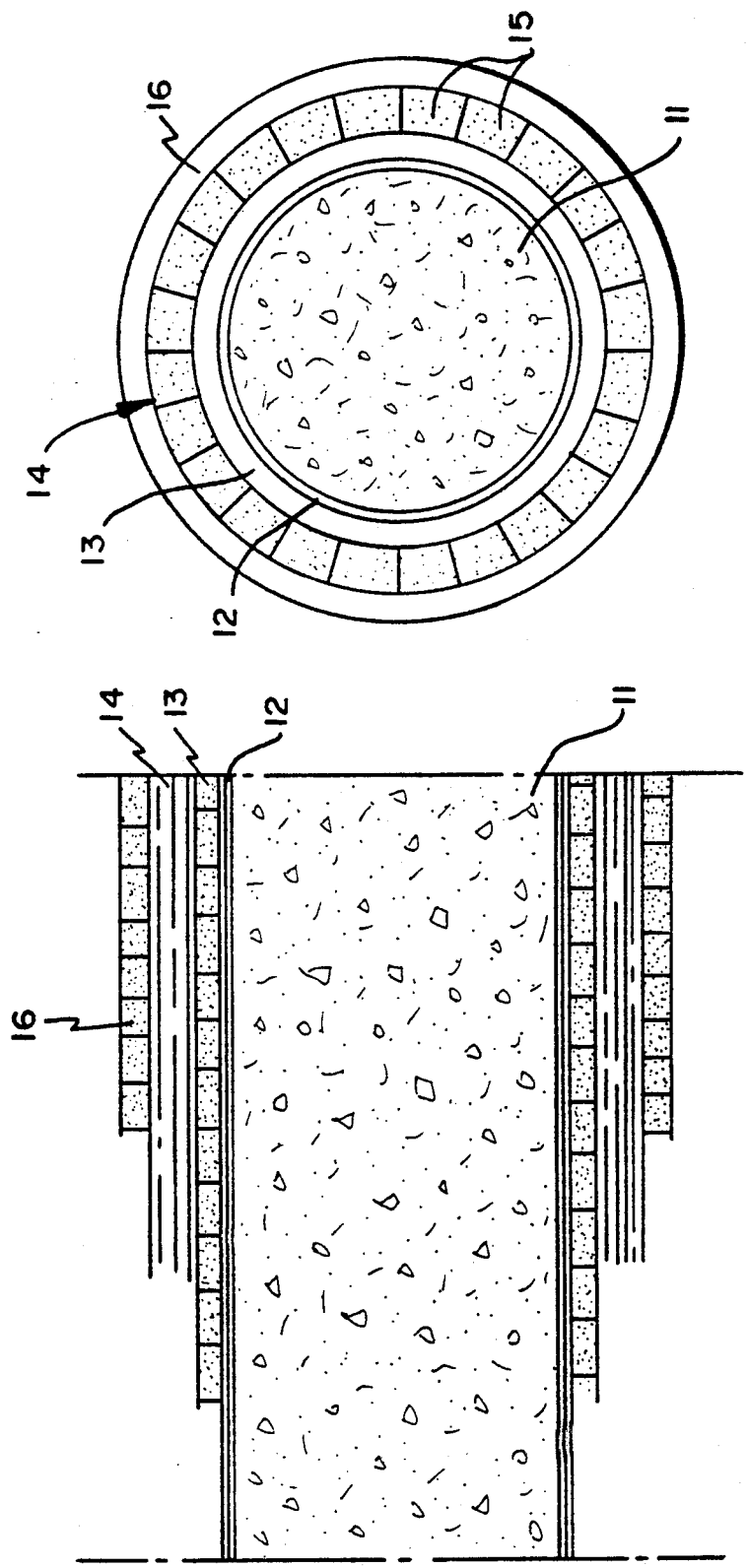

METHOD OF MANUFACTURING AN ELONGATED STRUCTURAL MEMBER

This application is a continuation of Ser. No. 183,442, filed on Apr. 18, 1988; now abandoned which is a continuation of Ser. No. 039,839, filed on Apr. 17, 1987 now abandoned; which is a continuation of Ser. No. 830,823, filed on Feb. 19, 1986 now U.S. Pat. No. 4,677,201.

BACKGROUND OF THE INVENTION

1. Field of the Invention

The present invention relates to a method of manufacturing an elongated structural member of substantially uniform cross-section.

2. Description of the Prior Art

Elongated structural members can be used for constituting or construction of different types of frameworks, for example frameworks for rackets for ballgames, bicycles, wheel-chairs and furniture. Typical structural members of this kind are manufactured from metal tubes or fibre reinforced plastic tubes. Metal tube structural members can easily be manufactured by means of bending but have the drawback of being relatively heavy.

Elongated structural members consisting of reinforced plastic tubes have low weight but can not be manufactured by means of bending. Thus, such plastic tube structural members require the use of premanufactured bends to be connected with straight tube sections by means of socket joints or an adhesive making the manufacturing of the structural members expensive and cumbersome.

OBJECT OF THE PRESENT INVENTION

It is an object of the present invention to provide a simple method of manufacturing an elongated structural member of substantially uniform cross-section which provides a structural member having favorable properties, especially with regard to its weight and strength.

SUMMARY OF THE INVENTION

The foregoing and other objects and advantages of the present invention are accomplished by a new and improved method comprising the steps of providing by pultrusion a multicomponent member comprising a porous core and a shell enclosing the core and including a layer of fibres impregnated with an uncured thermosetting plastic, positioning the multicomponent member in a mould and curing said rawling. In a preferred embodiment of the method according to the invention the shell of the multicomponent member is formed from four different layers, a first layer enclosing the core and consisting of an air-tight skin, a second layer enclosing the skin and consisting of peripherally extending fibres, a third layer enclosing the second layer and consisting of axially extending fibres impregnated with an uncured thermosetting plastic, and a fourth layer enclosing the third layer and consisting of peripherally extending fibres.

A modified embodiment of the method according to the invention comprises the steps of providing two the multicomponent members, each multicomponent member comprising a compressible core and a shell enclosing the core and including a layer of fibres impregnated with an uncured thermosetting plastic, positioning said rawlings in separate mould cavities of two separated mould parts, each multicomponent member having a substantially circular section with an outer diameter D, the section of each mould cavity comprising a semi-circular portion having a diameter D and a rectangular portion having long sides D, one of the long sides being positioned adjacent the diameter of the semi-circular portion, and short sides of a length less than D/2 but greater than D/4, closing the mould halves while compressing and deforming the cores of the multicomponent members and curing said multicomponent members.

BRIEF DESCRIPTION OF THE DRAWINGS

For a better understanding of the present invention reference should be had to the following detailed description taken in conjunction with the drawings, in which:

FIG. 1 is a longitudinal section of a rawling to be used for conducting the method according to the present invention into effect;

FIG. 2 is a cross-sectional view of a multicomponent member according to FIG. 1;

DESCRIPTION OF THE PREFERRED EMBODIMENTS

Figure 3:
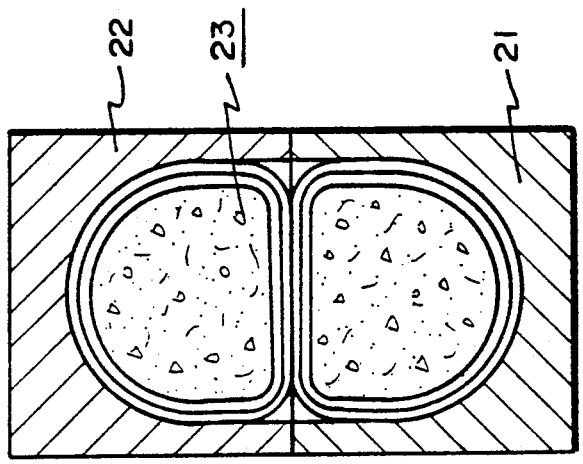
FIG. 3 illustrates a section of a lower portion of a mould for conducting an embodiment of the method according to the invention into effect.

In FIGS. 1 and 2 reference numeral 11 designs a core consisting of foamed plastic. This core is enclosed by a first layer 12, either consisting of a gas-tight skin unitary with the core itself or consisting of a thin plastic foil. The purpose of the skin 12 is to prevent air from being expelled from the core when the multicomponent member cured for providing an elongated structural member. Such expelling of air from the core may weaken the structural member. The skin shall also prevent the core from absorbing thermosetting plastic. Such absorption of thermosetting plastic causes an increased weight without any corresponding improvement of the strength.

A second layer 13 encloses the core 11 and the skin 12 and consists of fibres peripherally wound around the skin 12. Preferably the fibres are in the form of a glass-fibre roving. This layer 13 does not have to be separately impregnated with thermosetting plastic.

A third layer 14 consists of axially extending glass-fibre threads 15 preferably also in the form of a roving and impregnated with an excess of uncured thermosetting plastic. The glass-fibre threads 15 are positioned so as to form a covering layer around the first and second layers 12 and 13, respectively.

Around the layers 12, 13 and 14 there are finally wound unimpregnated fibres, preferably in the form of a roving, constituting a fourth outer layer 16. Because of the fact that the third layer 14 comprises an excess of thermosetting plastic, the thermosetting plastic is transferred also to the layers 13 and 16 which are thereby also impregnated. A multicomponent member as described can be bent and twisted to substantially any shape and figure. This is provided by carefully positioning the multicomponent member in the cavity of a mould, whereupon the multicomponent member is cured, preferably in heat, for constituting an elongated structural member. The specific construction of the multicomponent member makes the final product extremely strong also in the bends thereof. The principle reason thereto is that the layer 13 consisting of peripherally wound roving provides a vault effect preventing the axial reinforcement layer 15 to bend inwards and collapse when being subjected to strong loads. The fourth outer layer 16 contributes to an improvement of the vault effect. Tests have shown that the strength of the structural member is reduced if the second layer 13 is excluded and the reinforcement thereof is added to the fourth outer layer 16. It has empirically been found that the relationship between the weights of the reinforced layers 13, 14 and 16 should be 8:100:10. This is true when the total thickness of the layers 12, 13, 14 and 16 is 1 mm in sporting products such as tennis rackets and ski poles of the curved type used in downhill race.

Figure 4:
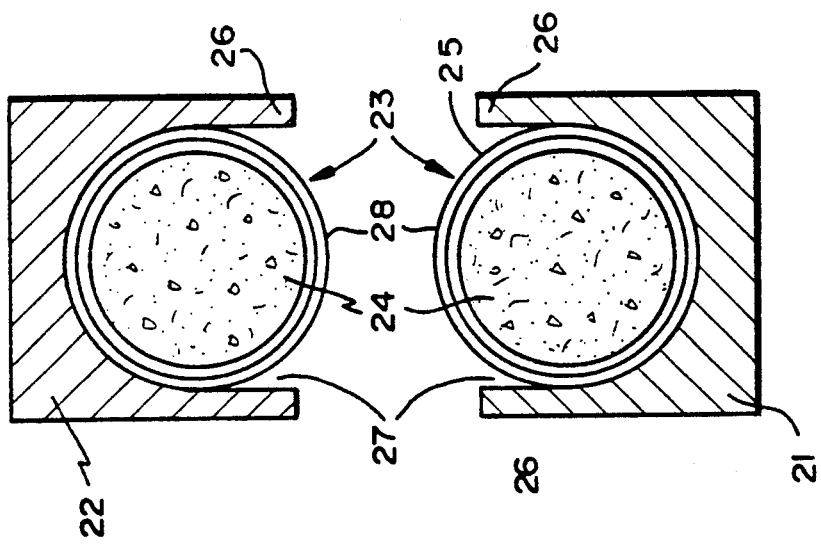
FIG. 4 illustrates a section of the mould provided with the multicomponent members prior to the closing of the mould.
Figure 5:
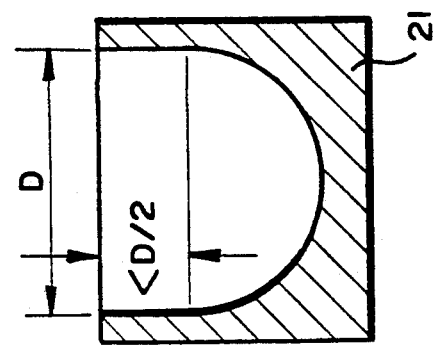
FIG. 5 illustrates a section of the mould of FIG. 4 in closed position.

In FIGS. 3, 4 and 5 reference numerals 21 and 22 design a lower and an upper portion of a mould. The mould portions 21 and 22 have the same section, i.e. the mould cavities of the moulds are of identical size and shape. As shown in FIG. 3 the sections of the cavities comprise a semi-circular surface having a diameter D and a rectangular surface postitioned on the semi-circular surface and having long sides D and short sides which are less than D/2 but greater than D/4, preferably having a length of about D/3. Two multicomponent members 23 are positioned in separate mould cavities, each multicomponent member consisting of a porous, compressible and deformable core 24 enclosed by a fibre layer, usually a glass-fibre layer, impregnated with a thermosetting plastic. Preferably the core consists of a relatively hard foamed plastic, for example urethane. The fibre layer 25 comprises axially extending as well as peripherally extending fibres. As appears from FIG. 4 the depths of the cavities are less than D. Thus, the multicomponent members 23 extend outside the mould cavities. On the other hand the multicomponent members do not completely fill up the cavities. Thus, there are provided ditches 27 between the multicomponent members and the sides 26 of the mould cavities. When the mould is closed the initial contact is provided between the outermost portions 28 of the two multicomponent members while the ditches 27 are still unfilled. The continued closing of the mold portions provide a draining of the thermosetting plastic from the fibre layers 25 due to a higher specific surface pressure while the axially extending fibres are at the same time partially forced out into the ditches together with thermosetting plastic. As the surface pressure is lower within the ditches than at the surface subjected to compression under the influence of the cores 24 positioned inside thereof the ditches are filled up with more fibres as well as with a higher proportion of thermosetting plastic contributing to a substantial reinforcing of the section in the area of the joint.

This method produces structural members constituting products of dramatically improved strength and life. According to prior art methods there is provided in the transition surface between the fibres of the multicomponent members and the thermosetting plastic such a compression over the entire surface that there is established direct contact between the fibres of the multicomponent members providing a disastrous strength of the product. The binding in the contact surface is so weak that a splitting takes place also at small loads.

The above method is especially favorable in manufacturing structural members for forming products in which an element is positioned between the two multicomponent members for example in ball-game rackets of the type having a tensioned net firmly connected with the structural members.

The invention can be modified within the scope of the following claims.

I claim:

1. A method of manufacturing an elongated, multicomponent structural member having a substantially uniform cross-section comprising a pultrusion process including the steps of:
   (a) forming a porous core having an outer surface;
   (b) applying a first layer comprising an air-tight skin over the outer surface of said porous core;
   (c) applying a second layer comprising peripherally-extending fibers over said first layer;
   (d) applying a third layer comprising axially-extending fibers impregnated with an excess of uncured thermosetting plastic over said second layer;
   (e) applying a fourth layer comprising peripherally-extending fibers over said third layer, said fibers of said fourth layer being substantially free of uncured thermosetting plastic;
   (f) positioning the resulting multi-component member in a mold and curing said multi-component member, wherein excess uncured thermosetting plastic from said third layer indirectly impregnates said fourth layer.

2. A method for manufacturing an elongated multi-component structural member according to claim 1, wherein in step (c) said second layer is substantially free of uncured thermosetting resin and in step (f) said second layer is at least partially indirectly impregnated with uncured thermosetting resin from said third layer, said first layer preventing the resulting uncured thermosetting plastic in said second layer from entering said core.

3. A method according to claim 1, wherein the weight ratio of said second, third and fourth layers in said multicomponent member is about 8:100:10.

4. A method for manufacturing an elongated structural member of substantially uniform cross-section, comprising the steps of:
   providing two elongated multi-component members, each multi-component member comprising a compressible core and a shell enclosing said core; said shell including a plurality of layers of fibers impregnated with an uncured thermosetting plastic, each multi-component member including a substantially circular section having an outer diameter D;
   providing two separate mold parts, each mold part having a cavity with a U-shaped cross-section including a semicircular portion and a rectangular portion, said semicircular portion having a diameter D and said rectangular portion having a pair of parallel long sides and a pair of parallel short sides, each of said long sides having a length D, one of said long sides being positioned adjacent the diameter of said semicircular portion, said short sides having a length less than D/2 and greater than D/4, said two mold parts being positioned with said open ends facing each other and with said multi-component members, when inserted into said cavities, extending past said rectangular portion;
   positioning said two multi-component members in said separate mold cavities;
   closing the mold parts while compressing and deforming the cores of the multi-component members and curing said multi-component members to produce an elongated structural member.

5. A method of manufacturing an elongated structural member according to claim 4, wherein each of said two multi-component members is formed by pultrusion process including the steps of:
  (a) forming a porous core having an outer surface;
  (b) applying a first layer comprising an air-tight skin over the outer surface of said porous core;
  (c) applying a second layer comprising peripherally-extending fibers over said first layer, the fibers of said second layer being substantially free of uncured thermosetting resin;
  (d) applying a third layer comprising axially-extending fibers impregnated with an excess of uncured thermosetting plastic over said second layer; and
  (e) applying a fourth layer comprising peripherally-extending fibers over said third layer, said fibers for said fourth layer being substantially free of uncured thermosetting plastic, thereby forming said multi-component member.

* * * * *